United States Patent
Scheibe

(10) Patent No.: US 8,757,588 B2
(45) Date of Patent: Jun. 24, 2014

(54) VALVE WITH AN ELECTROMAGNETIC DRIVE

(75) Inventor: Ralf Scheibe, Kunzelsau (DE)

(73) Assignee: Buerkert Werke GmbH (DE)

( * ) Notice: Subject to any disclaimer, the term of this patent is extended or adjusted under 35 U.S.C. 154(b) by 971 days.

(21) Appl. No.: 12/226,454

(22) PCT Filed: Mar. 29, 2007

(86) PCT No.: PCT/EP2007/002819
§ 371 (c)(1),
(2), (4) Date: Dec. 31, 2008

(87) PCT Pub. No.: WO2007/124826
PCT Pub. Date: Nov. 8, 2007

(65) Prior Publication Data
US 2009/0314975 A1     Dec. 24, 2009

(30) Foreign Application Priority Data

Apr. 27, 2006  (DE) .................... 20 2006 006 825 U

(51) Int. Cl.
*F16K 31/02* (2006.01)

(52) U.S. Cl.
USPC ................................... 251/129.16

(58) Field of Classification Search
CPC ............ F16K 31/0682; F16K 31/0658; H01F 2007/086; H01F 7/14
USPC .............................. 251/129.15, 129.16, 129.2
See application file for complete search history.

(56) References Cited

U.S. PATENT DOCUMENTS

| | | | |
|---|---|---|---|
| 2,250,297 A | | 4/1951 | Ray |
| 3,796,409 A | | 3/1974 | Burckhardt et al. |
| 4,889,314 A | * | 12/1989 | Hashizume et al. ..... 251/129.02 |
| 5,048,564 A | * | 9/1991 | Gaiardo .................... 137/599.07 |
| 5,139,226 A | * | 8/1992 | Baldwin et al. ............. 251/129.2 |
| 5,388,984 A | * | 2/1995 | Meslif .............................. 431/12 |
| 5,799,696 A | * | 9/1998 | Weiss ........................ 137/625.44 |
| 5,947,442 A | * | 9/1999 | Shurman et al. .......... 251/129.19 |
| 6,124,775 A | * | 9/2000 | Linkner, Jr. .................... 335/278 |
| 6,145,806 A | * | 11/2000 | Dettmann ........................ 251/65 |
| 6,311,951 B1 | * | 11/2001 | Samulowitz ............. 251/129.16 |
| 6,496,092 B1 | | 12/2002 | Schnatterer et al. |
| 6,550,745 B2 | | 4/2003 | Bergstrom et al. |

(Continued)

FOREIGN PATENT DOCUMENTS

| CN | 1087199 | 5/1994 |
|---|---|---|
| DE | 2 040 199 A1 | 2/1972 |

(Continued)

OTHER PUBLICATIONS

Kallenbach et al, Elektromagnete—Grundlagen, Berechnung, Entwurf und Anwendung, e. Auflage 2003, Teubrier Verlag Stuttgart.

(Continued)

*Primary Examiner* — John K Fristoe, Jr.
*Assistant Examiner* — Matthew W Jellett
(74) *Attorney, Agent, or Firm* — Hayes Soloway P.C.

(57) ABSTRACT

A valve having an electromagnetic drive including a core that is arranged between two pole pieces and has a winding applied thereon which, at least in the direction of a dimension determining the structural size of the valve, rests on the core without a bobbin wall interposed.

9 Claims, 4 Drawing Sheets

(56) References Cited

U.S. PATENT DOCUMENTS

| | | | |
|---|---|---|---|
| 6,700,232 B2 | 3/2004 | Rieck et al. | |
| 6,737,946 B2 * | 5/2004 | Seale et al. | 335/279 |
| 6,786,238 B2 | 9/2004 | Frisch | |
| 6,798,323 B2 * | 9/2004 | Smith et al. | 335/132 |
| 6,945,480 B2 * | 9/2005 | Pfrommer et al. | 239/585.3 |
| 6,955,332 B2 | 10/2005 | Kees | |
| 7,338,029 B2 * | 3/2008 | Asai et al. | 251/65 |
| 7,978,038 B2 * | 7/2011 | Vannier et al. | 335/281 |
| 2001/0030307 A1 * | 10/2001 | Bergstrom et al. | 251/129.15 |
| 2002/0190825 A1 | 12/2002 | Danley et al. | |
| 2003/0189183 A1 * | 10/2003 | Noller et al. | 251/129.21 |
| 2004/0227116 A1 | 11/2004 | Kees | |
| 2005/0115525 A1 | 6/2005 | Chung et al. | |
| 2007/0001135 A1 * | 1/2007 | Asai et al. | 251/65 |
| 2010/0219361 A1 * | 9/2010 | Echenagusia Saez de Zaitegui et al. | 251/129.15 |

FOREIGN PATENT DOCUMENTS

| | | | |
|---|---|---|---|
| DE | 24 58 516 | 6/1976 | |
| DE | 19712669 | 10/1998 | |
| DE | 299 05 883 U1 | 6/1999 | |
| DE | 100 18 114 A1 | 10/2001 | |
| DE | 103 40 941 A1 | 3/2005 | |
| DE | 10 2004 050 013 A1 | 6/2005 | |
| DE | 602 02 323 T2 | 12/2005 | |
| EP | 0 260 065 | 11/1991 | |
| EP | 1 172 592 A2 | 1/2002 | |
| EP | 1 371 888 | 12/2003 | |
| EP | 1 477 715 | 11/2004 | |
| JP | 61002982 A | 1/1986 | |
| JP | 10246352 A | 9/1998 | |
| JP | 2000-517037 | 12/2000 | F16K 31/06 |
| JP | 2004360796 A | 12/2004 | |
| WO | 9733287 A1 | 12/1997 | |
| WO | WO 00/60261 | 10/2000 | |
| WO | WO 2004/113713 | 12/2004 | |
| WO | WO2006/018934 | 2/2006 | |
| WO | WO2006018931 | 2/2006 | |

OTHER PUBLICATIONS

Japanese Official Action, issued Sep. 10, 2013 in related application serial No. 2009-506935 (4 pages).

* cited by examiner

FIG. 1
FIG. 2
FIG. 2A
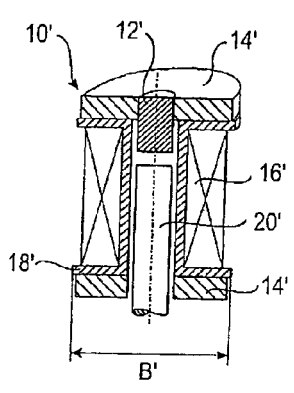
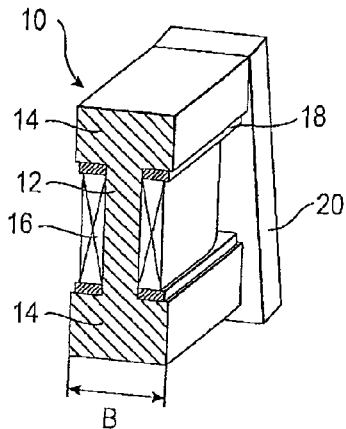
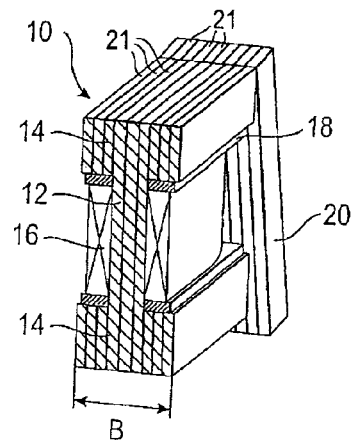
FIG. 3
FIG. 4
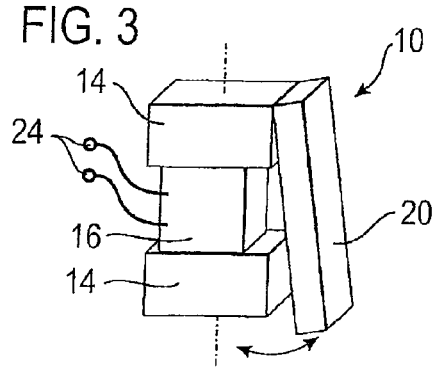
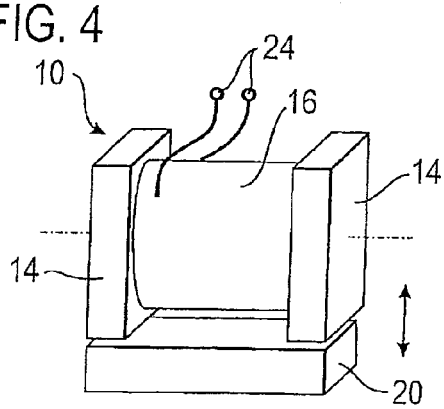
FIG. 5
FIG. 6
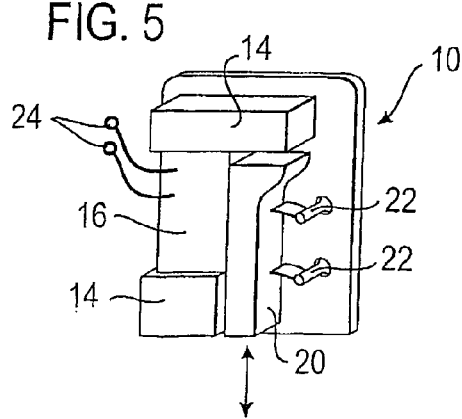
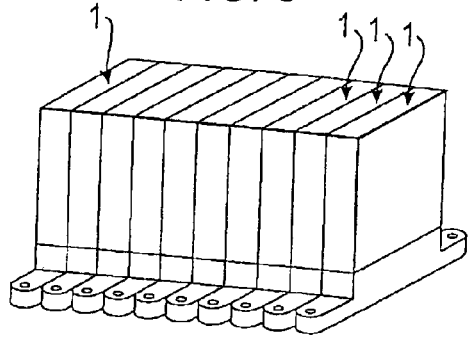

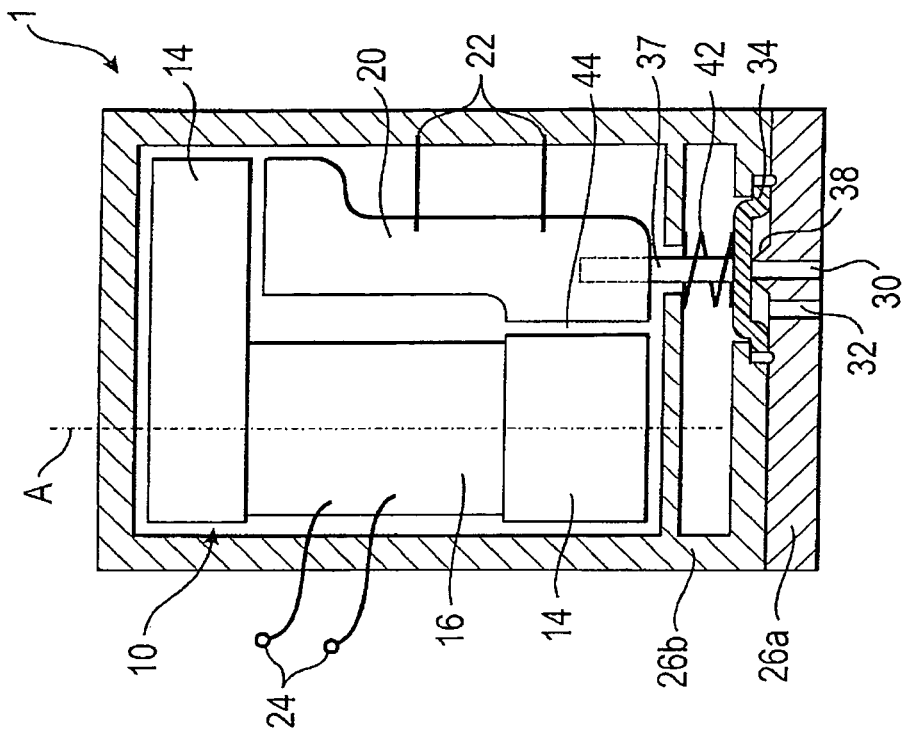
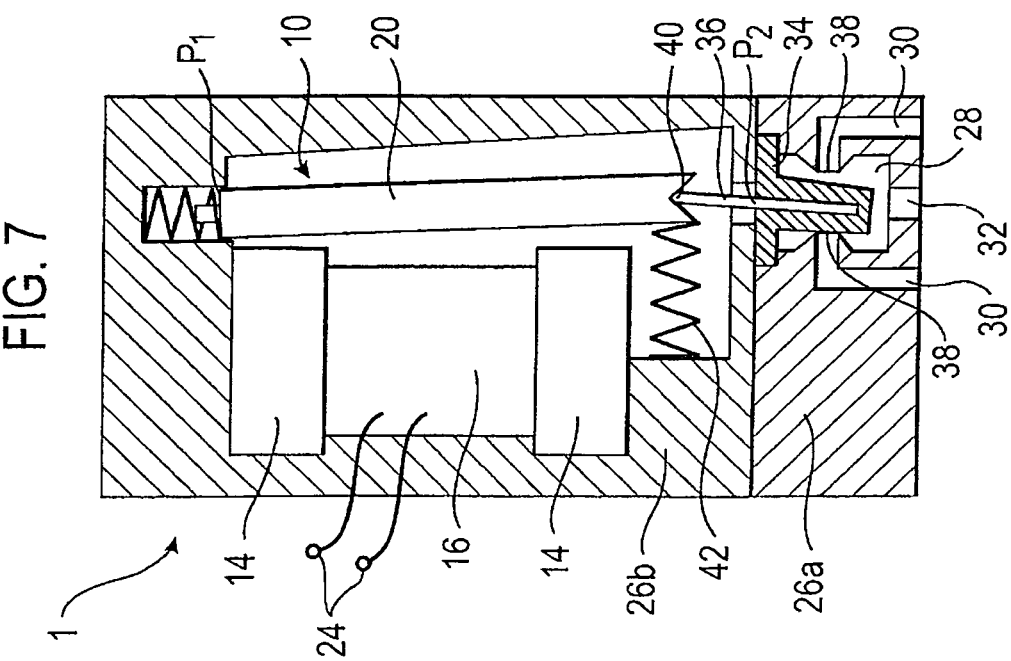

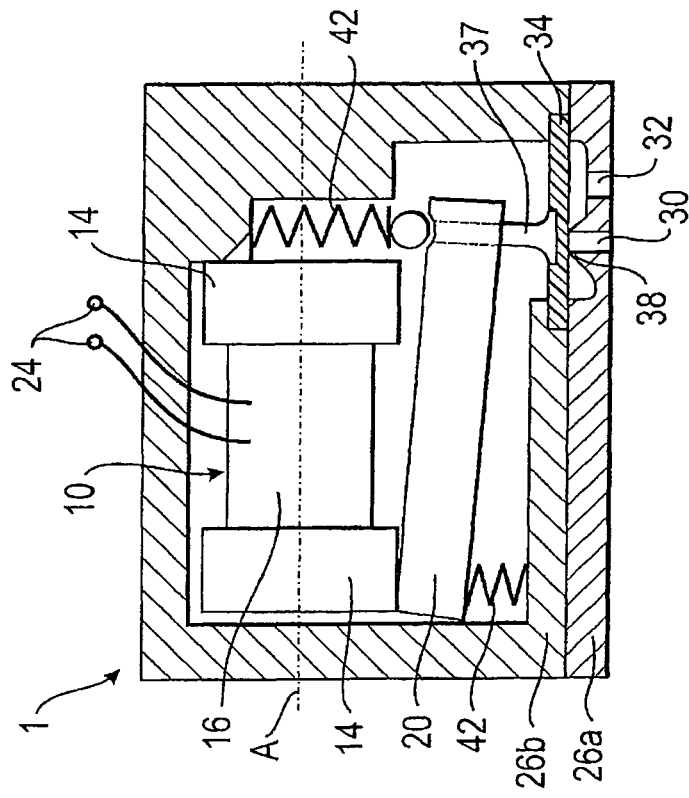
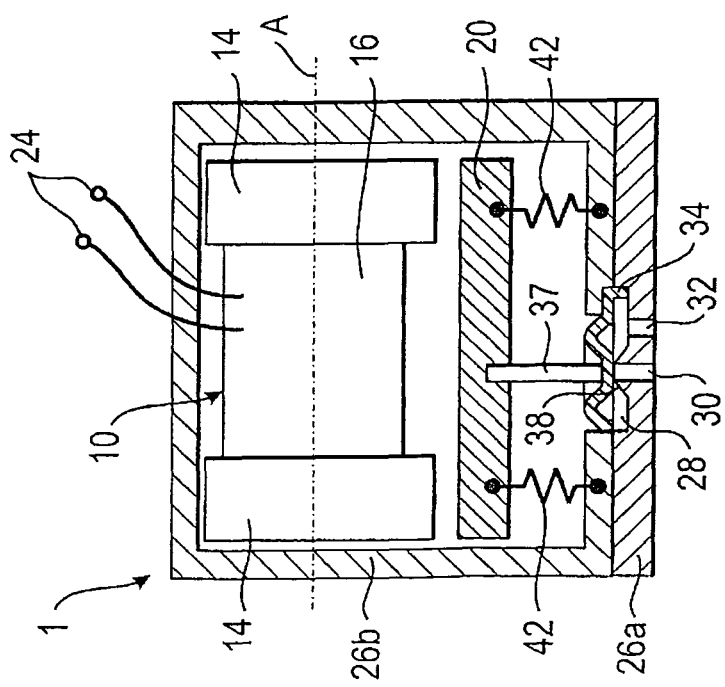

VALVE WITH AN ELECTROMAGNETIC DRIVE

FIELD OF THE INVENTION

The present invention relates to a valve with an electromagnetic drive.

BACKGROUND OF THE INVENTION

There is a growing demand on the market for ever smaller valves. The smaller dimensions, however, lead to a reduction in the structural volume and thus, in the power that can be converted in the valve. The maximum mechanical power output of a magnet coil, for example, depends on many factors, but in particular on the structural volume and the ratio of the copper windings and the iron cross-section to be accommodated in the coil. FIG. 1 shows an electromagnetic drive 10' for use in a valve according to the prior art. The drive 10' comprises a core 12', two pole pieces 14', and a winding 16' disposed on the wall of a bobbin 18'. Part of the core is formed as a movable lifting armature 20' and arranged inside the bobbin 18' at a distance from the latter. The dimension determining the structural size of the associated valve is denoted by B' in the Figure.

SUMMARY OF THE INVENTION

The invention provides a valve with an electromagnetic drive which, compared with prior art valves, distinguishes itself by an especially small structural size while the drive has a high power output.

In accordance with a first aspect of the invention, this is achieved by a valve having an electromagnetic drive including a core that is arranged between two pole pieces and has a winding applied thereon which, at least in the direction of a dimension determining the structural size of the valve, rests on the core without a bobbin wall interposed. Compared with the prior art, this configuration provides more space for the winding, with the external dimensions of the valve remaining the same. In this way, a larger number of turns of the coil may be accommodated and a greater magnetomotive force and, hence, a greater magnetic force can be attained while the structural size remains identical. Conversely, when the power output of the electromagnetic drive remains the same as in the prior art, this allows the structural size of the valve to be reduced.

Preferably, the pole pieces are formed in one piece with the core.

It is desirable for cost reasons to form the core and the pole pieces of conventional iron, rather than of ferrite, the core and the pole pieces then being in the form of layered metal sheets (i.e. laminated) to avoid eddy current losses.

According to a preferred embodiment, the pole pieces project over the winding and the drive further includes an armature which cooperates with the pole pieces. More particularly, the armature is arranged outside the winding, as a result of which the air gap necessary for movement of the armature (when the armature is disposed inside the winding) may be eliminated. This reduces the structural size still further. The armature may, of course, also be in the form of laminated metal sheets.

A particularly space-saving configuration is obtained if the armature is arranged beside the winding-covered core in the direction of a dimension other than that which determines the structural size of the valve.

The armature may be a hinged armature, a plate armature, or a lifting armature, which in each case is arranged outside the winding and is positioned in relation to the winding such that it does not increase the structural size of the valve. When a lifting armature is used, it is provided with, e.g., a parallelogram suspension.

In accordance with a second aspect of the invention, provision is made for a valve having an electromagnetic drive including a plurality of parallel cores which are connected by a yoke and each have a winding applied thereon which, at least in the direction of a dimension determining the structural size of the valve, rests on the core without a bobbin wall interposed. Again, by dispensing with the bobbin wall, the structural size of the valve may be reduced or the space that is available to accommodate the winding may be increased.

Preferably, the cores, at their respective free ends opposite the yoke, each form a pole piece for cooperation with an armature of the drive. Again, the armature is advantageously arranged such that it is not included in the structural size of the valve as related to a particular dimension.

The armature may be a hinged armature or a plate armature cooperating with the free ends of the cores that are embodied as pole pieces.

Again for cost reasons, preferably at least the core is in the form of laminated metal sheets.

BRIEF DESCRIPTION OF THE DRAWINGS

Further features and advantages of the invention will become apparent from the description below of several preferred embodiments with reference to the enclosed drawings, in which:

FIG. 1 shows a perspective view of an electromagnetic drive for a valve according to the prior art, partly in section;

FIG. 2 shows a perspective view of an electromagnetic drive as is employed in a valve according to the invention, partly in section;

FIG. 2A shows a perspective view of an electromagnetic drive, modified in comparison with FIG. 2, for a valve according to the invention, partly in section;

FIG. 3 shows a perspective view of an electromagnetic drive with a hinged armature for a valve according to the invention;

FIG. 4 shows a perspective view of an electromagnetic drive with a plate armature for a valve according to the invention;

FIG. 5 shows a perspective view of an electromagnetic drive with a lifting armature for a valve according to the invention;

FIG. 6 shows a perspective view of a plurality of valves according to the invention, in an in-line design;

FIG. 7 shows a sectional view of a valve according to the invention, with an electromagnetic drive according to FIG. 3;

FIG. 8 shows a sectional view of a valve according to the invention, with an electromagnetic drive according to FIG. 5;

FIG. 9 shows a sectional view of a valve according to the invention, with an electromagnetic drive according to FIG. 4;

FIG. 10 shows a sectional view of a valve according to the invention, slightly modified in comparison with FIG. 9;

DESCRIPTION OF THE PREFERRED EMBODIMENTS

Figure 11:
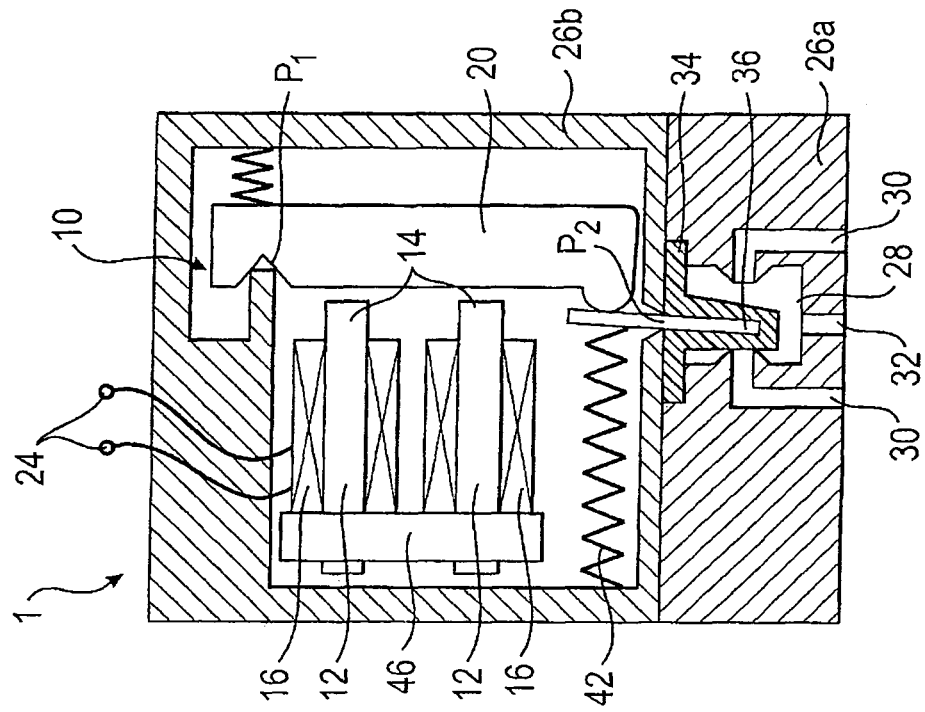
FIG. 11 shows a sectional view of a valve according to an alternative embodiment of the invention, the electromagnetic drive of the valve including a hinged armature.

FIG. 2 schematically shows an electromagnetic drive 10 for a valve according to the invention, which is more particularly a narrow valve having a structural size of smaller than or equal to 5 mm, preferably about 4.5 mm. The drive 10 has a core 12 which is arranged between two pole pieces 14 and formed in one piece therewith. The core 12 has a winding 16 applied thereon, which is formed of a multitude of copper turns. Further provided is a bobbin 18 which is arranged between the winding 16 and he pole pieces 14 but which, unlike in the prior art, has no wall between the core 12 and the winding 16 at least in the direction of a dimension B determining the structural size of the valve. As can be seen in this FIG. 2, the dimension B corresponds to a direction which is substantially perpendicular to a length extension of the core. The pole pieces 14 project over the winding 16 and cooperate with an armature 20 which is arranged in relation to the pole pieces 14 such that it does not enlarge the structural size of the valve in the dimension B. Deviating from the illustration shown in FIG. 2, the bobbin 18 may also be completely eliminated.

FIG. 2A illustrates a preferred variant of the electromagnetic drive 10, which differs from the one described so far in that the core 12, the pole pieces 14, and the armature 20 are in the form of laminated metal sheets 21 which are arranged side by side in the direction of the dimension B.

FIGS. 3 to 5 show different configurations of the electromagnetic drive 10, the armature 20 being formed alternatively as a hinged armature (FIG. 3), as a plate armature (FIG. 4), or as a lifting armature arranged outside the winding 16 and having a parallelogram suspension 22 (FIG. 5). Reference numeral 24 denotes the electrical connections of the winding 16. Again, deviating from the illustration shown, the core 12, the pole pieces 14 and/or the armature 20 may be made in laminated form.

The drives 10 shown allow a particularly flat or narrow valve design, thus making the valves particularly suitable for a space-saving in-line construction such as, e.g., for well plate applications, with valves having a structural size of less than 9 mm being employed in so-called 96 well plates, while valves having a structural size of less than or equal to 4.5 mm can be used in 384 well plates. Such an in-line construction of valves 1 is shown in FIG. 6.

FIG. 7 shows a valve 1 according to the invention which in a dimension perpendicular to the plane of projection has a structural size of 4.5 mm. The valve 1 has a two-part housing 26a, 26b, a valve chamber 28 being arranged in the first housing part 26a and an electromagnetic drive 10 according to FIG. 3 being arranged in the second housing part 26b. A total of three flow channels for a fluid medium open into the valve chamber 28, of which two are formed as inlet channels 30 and one as an outlet channel 32. A sealing body 34 made of an elastic material is clamped between the housing parts 26a, 26b, which seals the valve chamber 28 hermetically from the drive 10 and provides for a separation of media in this way.

A two-armed actuating lever 36 is set in the sealing body 34; that lever arm which is the lower arm in the Figure constitutes one closing body each for the valve seats 38 provided at the inlet channels 30. The upper arm is actuated by the drive 10 and, for this purpose, is connected directly with the armature 20 of the drive 10 by means of a knife-edge bearing 40, the armature 20 swiveling about a bearing point $P_1$ upon actuation of the drive 10 while the actuating lever 36 executes a swiveling movement about a bearing point $P_2$. Further provided is a spring member 42 that transfers the actuating lever 36 to a defined final position. An adjustment of the valve 1 is possible by changing the positions of the pole pieces 14 in the valve 1.

FIG. 8 shows an alternative configuration of the valve 1, which includes an electromagnetic drive 10 similar to that of FIG. 5. Identical reference numerals will be used for identical or functionally identical components below, and only the differences from the valve described so far will be discussed.

Instead of a lever, in the valve 1 according to FIG. 8 an actuating tappet 37 is made use of. Along with the sealing body 34, the lower end of the actuating tappet 37 forms a closing body for the valve seat 38. The actuating tappet 37 is connected directly to the armature 20 (in this case a lifting armature). As an alternative, a coupling piece may be intercalated here. Upon actuation of the drive 10, the armature 20, which is mounted at the housing part 26b by means of a parallelogram suspension 22, will execute an approximately linear lifting motion parallel to an axis A of the drive 10, as a result of which it drives the actuating tappet 37 to open or close the valve seat 38. To this end, a small air gap 44 is provided between the lower pole piece 14 in the Figure and the armature 20, which, as an alternative to the parallel suspension 22 as shown may also be realized by a ball bearing or a roller bearing. For adjustment of the valve, the spacing between the armature 20 and the closing body, the length of a coupling member between the actuating tappet 37 and the armature 20, or the position of the upper pole piece 14 may be changed.

FIGS. 9 and 10 show two further configurations of the valve 1 according to the invention, the respective drives 10 each having an armature 20 in the form of a plate armature which, upon actuation of the drive 10, will execute an approximately linear lifting motion perpendicular to the axis A of the drive. The actuating tappet 37 is connected to the armature 20 either directly or by means of a coupling piece. Provision is made for a plurality of spring members 42 which transfer the closing body to a defined final position. An adjustment of the valve 1 is effected by changing the spacing between the armature 20 and the closing body, by changing the length of a coupling member arranged in between, or by changing the position of the pole pieces 14.

Figure 12:
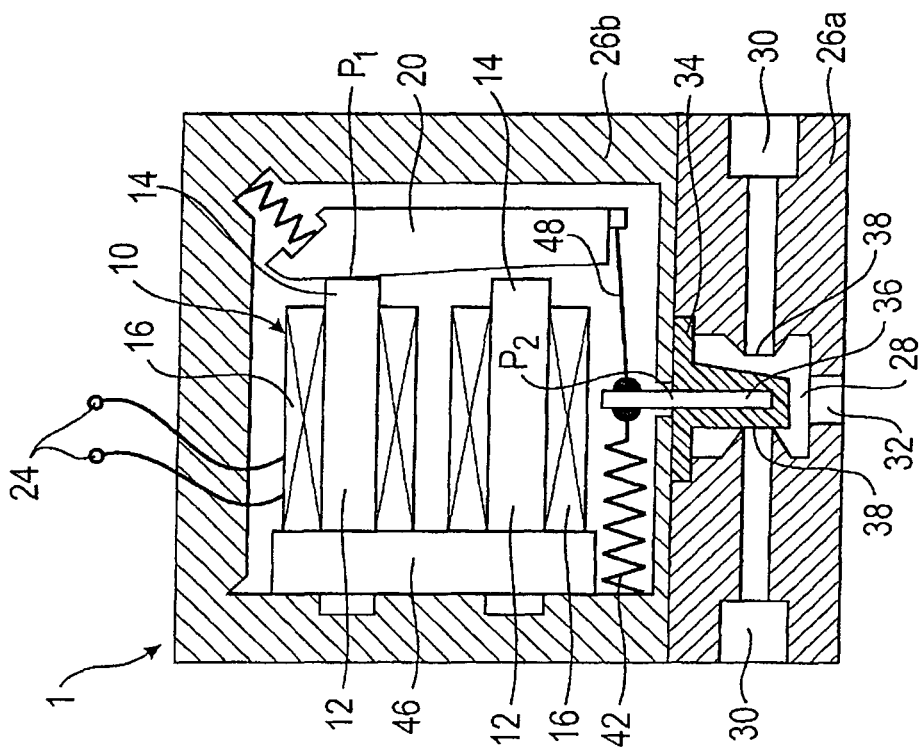
FIG. 12 shows a sectional view, similar to FIG. 11, of a further valve according to the invention.

Finally, FIGS. 11 and 12 show valves 1 in accordance with an alternative embodiment in which the electromagnetic drive 10 includes a plurality of, in the present case two, parallel cores 12 which are connected by a yoke 46 and each have a winding 16 applied thereon. Here, too, the winding 16, at least in the direction of a dimension determining the structural size of the valve 1, rests on the respective core 12 without a bobbin wall interposed. At their respective free ends opposite the yoke 46, the cores 12 each form a pole piece 14 which cooperates with the armature 20 of the drive 10. In the valves 1 shown in FIGS. 11 and 12, the armature 20 is a hinged armature, but it could just as well be in the form of a plate armature.

Otherwise, the functioning of the valves 1 according to FIGS. 11 and 12 is very similar to that of the valve according to FIG. 7, for which reason reference is made to the associated description. In contrast to the valve of FIG. 7, in the valve according to FIG. 11 a coupling member 48 is provided between the actuating lever 36 and the armature 20 while in the valve according to FIG. 12, the armature 20 directly engages the actuating lever 36. The valve may be adjusted by changing the spacing between the armature 20 and the actuating lever 36, by changing the position of the coupling member 48 (if provided), or by changing the position of the pole pieces 14.

It should be appreciated that cores 12, pole pieces 14 and, where appropriate, armatures 20 made up of laminated metal sheets may be used in the drives 10 of all of the valves of FIGS. 7 to 12.

The invention claimed is:

1. A space-saving, in-line construction comprising a plurality of valves, each valve having a flat or narrow valve design, wherein each of said valves
has a dimension determining a structural size of the valve, said structural size-determining dimension being less than 9 mm,
wherein each of the valves comprises an electromagnetic drive including at least one core and a winding applied thereon, a bobbin and an armature, wherein (a) the core is arranged between two pole pieces, which project over the winding and cooperate with the armature; (b) the bobbin is arranged between the winding and the pole pieces, the bobbin having no wall, at least in the direction of said dimension determining the structural size of the valve, and the winding resting on the core in said direction of the dimension determining the structural size of the valve without a bobbin wall interposed for increasing the space for accommodating the winding; and (c) the armature of the valve cooperates with the pole pieces and is arranged in relation to the pole pieces such that it does not enlarge the structural size of the valve, wherein the armature is further arranged beside the winding-covered core in a direction of a dimension other than that which determines the structural size of the valve.

2. The space-saving, in-line construction according to claim 1, wherein for the valves of the in-line construction, the pole pieces are formed in one piece with the core.

3. The space-saving, in-line construction according to claim 1, wherein for the valves of the in-line construction, the core and the pole pieces are in the form of laminated metal sheets.

4. The space-saving, in-line construction according to claim 3, wherein the laminated metal sheets are arranged side-by-side in the direction determining the structural size of the valve.

5. The space-saving, in-line construction according to claim 1, wherein the armatures of the valves of the in-line construction are hinged armatures.

6. The space-saving, in-line construction according to claim 1, wherein the armatures of the valves of the in-line construction are plate armatures.

7. The space-saving, in-line construction according to claim 1, wherein the armatures of the valves of the in-line construction are lifting armatures.

8. The space-saving, in-line construction according to claim 1, wherein the bobbin having no wall at least in the direction of said dimension determining the structural size of the valve, the bobbin partially remaining between the core and the winding.

9. The space-saving, in-line construction according to claim 1, wherein each of said valves has a dimension determining the structural size of the valve, said structural size-determining dimension being less than or equal to 4.5 mm.

* * * * *